(12) United States Patent
Proctor

(10) Patent No.: US 7,490,945 B2
(45) Date of Patent: Feb. 17, 2009

(54) WEAR-PROOF DÉTENTE FOR FOLDING MIRRORS

(75) Inventor: Ryan Proctor, Port Huron, MI (US)

(73) Assignee: Visiocorp Patents S.a.r.l., Luxembourg (LU)

( * ) Notice: Subject to any disclaimer, the term of this patent is extended or adjusted under 35 U.S.C. 154(b) by 358 days.

(21) Appl. No.: 10/589,708

(22) PCT Filed: Feb. 18, 2005

(86) PCT No.: PCT/US2005/005519

§ 371 (c)(1),
(2), (4) Date: Aug. 17, 2006

(87) PCT Pub. No.: WO2005/079535

PCT Pub. Date: Sep. 1, 2005

(65) Prior Publication Data

US 2007/0165315 A1    Jul. 19, 2007

Related U.S. Application Data

(60) Provisional application No. 60/545,380, filed on Feb. 18, 2004.

(51) Int. Cl.
*G02B 7/182* (2006.01)
*B60R 1/06* (2006.01)
(52) U.S. Cl. ............. 359/841; 359/872; 359/900; 248/478; 248/479; 248/900
(58) Field of Classification Search ............ 359/841, 359/872, 900; 248/477, 478, 479, 900
See application file for complete search history.

(56) References Cited

U.S. PATENT DOCUMENTS

| 4,789,232 | A   |   | 12/1988 | Urbanek |
|-----------|-----|---|---------|---------|
| 4,893,916 | A   | * | 1/1990  | Sakuma et al. ............. 359/841 |
| 5,332,186 | A   | * | 7/1994  | Lutz ........................ 248/549 |
| 5,639,054 | A   | * | 6/1997  | Gerndt et al. ............. 248/478 |
| 6,130,514 | A   |   | 10/2000 | Oesterholt et al. |
| 6,133,704 | A   | * | 10/2000 | Yoshida et al. ............ 318/466 |
| 6,183,098 | B1  | * | 2/2001  | Martin ..................... 359/871 |
| 6,286,968 | B1  | * | 9/2001  | Sailer et al. .............. 359/872 |
| 6,322,221 | B1  | * | 11/2001 | van de Loo ............... 359/841 |
| 6,390,630 | B1  | * | 5/2002  | Ochs ........................ 359/841 |
| 6,543,902 | B2  | * | 4/2003  | Bohm ....................... 359/841 |
| 6,626,548 | B2  | * | 9/2003  | de Melo Neto ........... 359/841 |
| 6,637,898 | B2  | * | 10/2003 | Hattori et al. ............. 359/841 |
| 6,742,756 | B1  | * | 6/2004  | Fimeri et al. ............. 248/479 |
| 7,137,715 | B2  | * | 11/2006 | Schuurmans et al. ...... 359/841 |

* cited by examiner

*Primary Examiner*—Ricky D Shafer
(74) *Attorney, Agent, or Firm*—Reising Ethington P.C.

(57) ABSTRACT

A folding assembly for a vehicle side mirror that employs specialized ramped détentes. The folding assembly includes a pivot tube and a pivot spring rotatably coupled to a case frame and rigidly coupled to a base frame. The base frame includes a series of ramped détentes that are seated within corresponding recesses in the case frame. The inside angle ($\beta_1$) of the ramps of the détentes is steeper than the outside angle ($\beta_2$) of the ramps of the détentes according to a predetermined formula so that when the case frame is rotated relative to the base frame, and the détentes move out of their recesses, the force of the rotation is distributed along the entire length of the ramp to increase the durability performance of the mirror and thus its longevity.

17 Claims, 4 Drawing Sheets

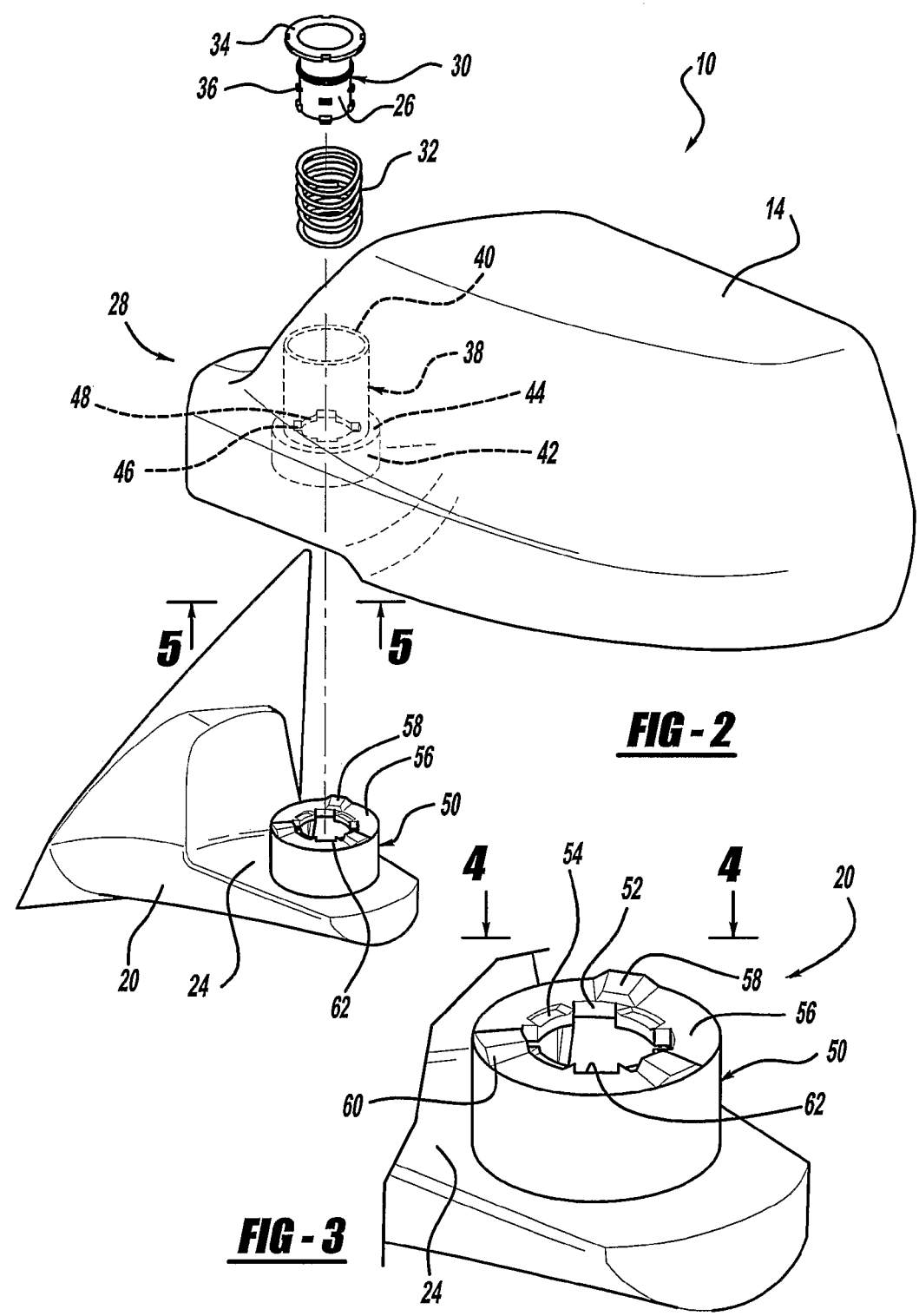

WEAR-PROOF DÉTENTE FOR FOLDING MIRRORS

CROSS-REFERENCE TO RELATED APPLICATIONS

This application is a National Stage of International Application No. PCT/US2005/005519 filed Feb. 18, 2005, which claims priority to U.S. Patent Application No. 60/545,380 filed on Feb. 18, 2004. The disclosures of the above applications are incorporated herein by reference.

BACKGROUND OF THE INVENTION

1. Field of the Invention

This invention relates generally to a folding mechanism for a vehicle side mirror and, more particularly, to a folding mechanism for a vehicle side mirror, where the folding mechanism includes a plurality of détentes having different inner and outer ramp angles to prevent wear.

2. Discussion of the Related Art

Vehicles employ side mirrors that allow the vehicle operator to see behind and to the side of the vehicle. State of the art side mirrors are sometimes elaborate assemblies that include various options and features that increase the operator's ability to see objects, more safely operate the vehicle, provide a more aesthetically pleasing appearance, etc. One common vehicle side mirror design employs a folding mechanism that allows the mirror to be rotated relative to a mounting bracket so that the mirror can be folded towards the vehicle in both a forward and backward direction. The folding mechanism allows the mirror to be put in a more desirable configuration during parking or the like so that the side mirror has less chance of being damaged.

One particular side mirror folding mechanism design employs a pivot tube and pivot spring in combination with a case frame and base frame, where the case frame pivots relative to the base frame on the pivot tube. The base frame includes one or more détentes having angled edge ramps that cooperate with specially configured recesses in the case frame. When the case frame is in the unfolded, forward-folded or rearward-folded position, the détentes align with and are secured within the recesses. By applying manual or motorized pressure to the case frame, the case frame rotates on the pivot tube against the bias of the pivot spring. The ramped edges of the détentes allow the détentes to move out of the recesses.

It has been observed that this mirror folding design causes the détentes to wear at the outside edge of the ramps where the load from the pivot spring is concentrated. Such a localized stress point on the détentes causes a premature failure because the détentes wear out too quickly, reducing the ability of the folding mechanism to maintain the side mirror in the unfolded configuration.

SUMMARY OF THE INVENTION

In accordance with the teachings of the present invention, a folding assembly for a vehicle side mirror is disclosed that employs specialized ramped détentes. The folding assembly includes a pivot tube and a pivot spring rotatably coupled to a case frame and rigidly coupled to a base frame. The base frame includes a series of ramped détentes that are seated within corresponding recesses in the case frame. The inside angle of the ramps of the détentes is steeper than the outside angle of the ramps of the détentes according to a predetermined formula so that when the case frame is rotated relative to the base frame, and the détentes move out of their recesses, the force of the rotation is distributed along the entire length of the ramp to increase the durability performance of the mirror and thus its longevity.

Additional advantages and features of the present invention will become apparent from the following description and appended claims, taken in conjunction with the accompanying drawings.

BRIEF DESCRIPTION OF THE DRAWINGS

FIG. 2 is an exploded perspective view of the vehicle side mirror shown in FIG. 1 separated from the vehicle;

FIG. 3 is a broken-away perspective view of a base frame of the vehicle side mirror shown in FIG. 1;

DETAILED DISCUSSION OF THE EMBODIMENTS

The following discussion of the embodiments of the invention directed to a specially configured ramped détente associated with a folding assembly of a vehicle side mirror is merely exemplary in nature, and is in no way intended to limit the invention or its applications or uses.

Figure 1:
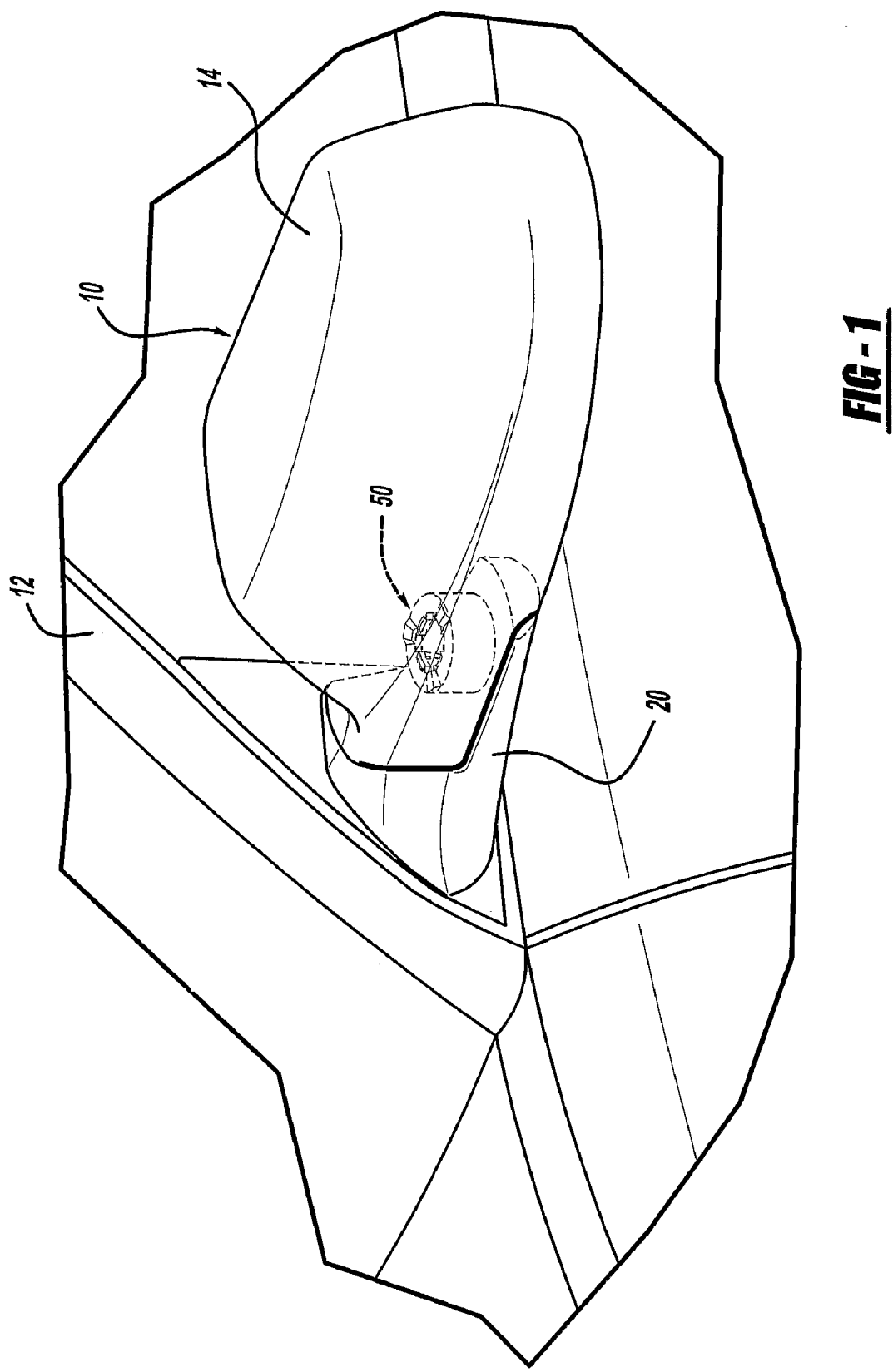
FIG. 1 is a perspective view of a vehicle side mirror mounted to a vehicle by a folding assembly, according to an embodiment of the present invention.
Figure 4:
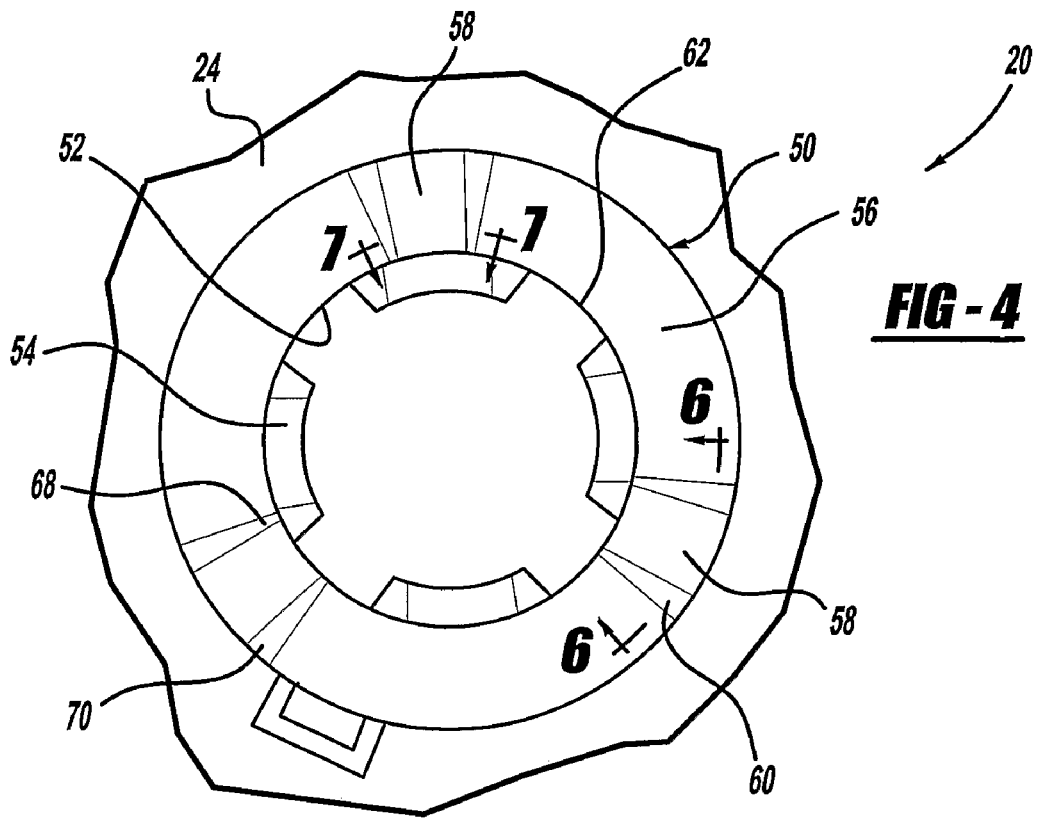
FIG. 4 is a top view of the base frame along line 4-4 in FIG. 3.

FIG. 1 is a perspective view of a vehicle side mirror assembly 10 mounted to a vehicle 12. FIG. 2 is an exploded perspective view of the side mirror assembly 10 separated from the vehicle 12. The side mirror assembly 10 includes a mirror housing 14 mounted on an internal case frame 16 (FIG. 5), and a mounting arm 20 including an internal base frame 24 (FIG. 4). The case frame 16 forms the support structure of the foldable portion of the mirror assembly 10 and the base frame 24 forms the support structure of the mounting structure of the mirror assembly 10.

The case frame 16 and the housing 14 are pivotally mounted to the base frame 24 and the mounting arm 20 by a folding assembly 28, according to an embodiment of the present invention. The folding assembly 28 includes a specially configured pivot tube 30 and a pivot spring 32. The pivot tube 30 includes a tube portion 26 having an upper rim 34 and two rows of symmetrically disposed tabs 36, as shown. The case frame 16 includes a specially configured bore 38 including a narrow portion 40 and a widened portion 42 defining a shoulder 44 therebetween. The bore 38 further includes symmetrically disposed notches 46 defining projections 48 around the circumference of the shoulder 44. The size and orientation of the notches 46 allow the tabs 36 to pass through the bore 38.

The base frame 24 includes a cylindrical mounting member 50 having an annular top portion 56 with a circular opening 62 therein. FIG. 3 is a perspective view of part of the mounting arm 20. A series of alternating notches 52 and projections 54 are formed around the edge of the opening 62. The mounting member 50 has a diameter that corresponds with the diameter of the widened portion 42 so that the mounting member 50 is positioned therein. The notches 46 and 52 align with each other, the projections 48 and 54 align with each other, and the bottom end of the tube portion 26 is positioned within the mounting member 50. Each of the housing 14, the mounting arm 20, the case frame 16 and the base frame 24 are molded members molded from a suitable plastic.

Figure 5:
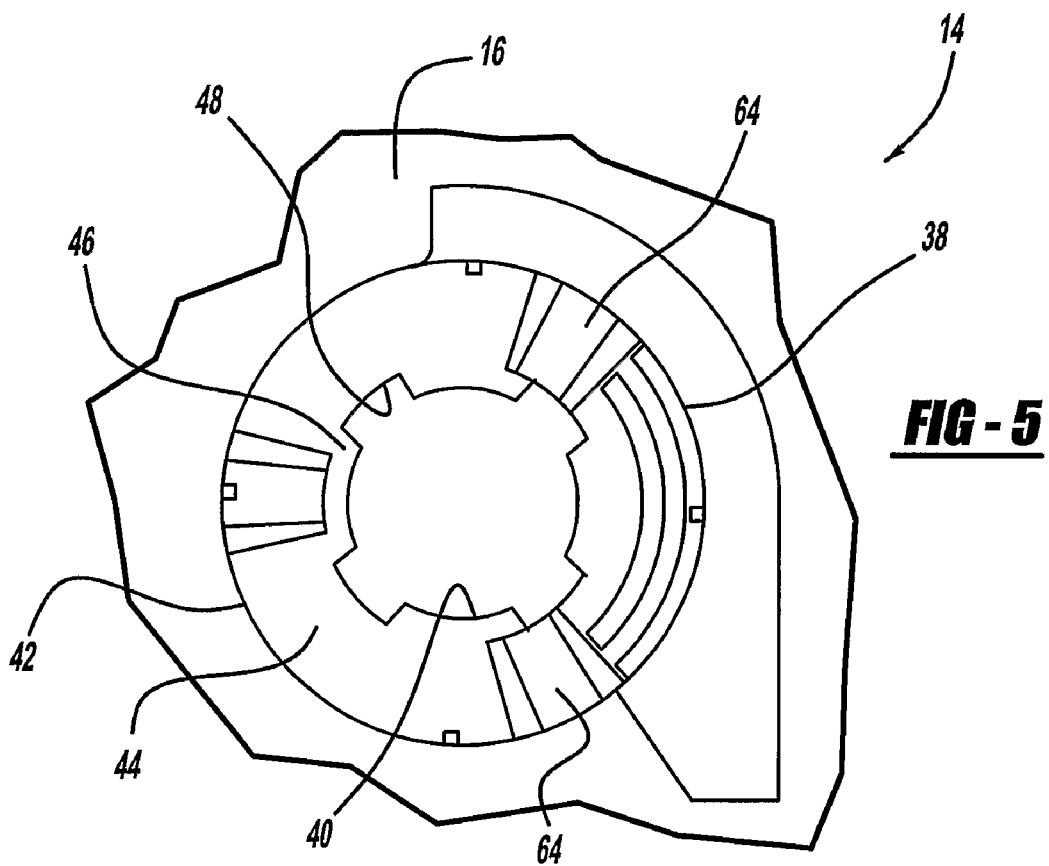
FIG. 5 is a bottom view of a case frame of the vehicle side mirror along line 5-5 in FIG. 2.

FIG. 4 is a top view of the mounting member 50 along line 4-4 in FIG. 3 and FIG. 5 is a bottom view of the bore 38 along line 5-5 in FIG. 2. According to the invention, the mounting member 50 includes a plurality symmetrically disposed ramped détentes 58 having angled side edges 60 that are formed on the top portion 56. Also, the bore 38 includes corresponding angled edge recesses 64 formed in an under surface of the shoulder 44. In an alternate embodiment consistent with the discussion herein, the mounting member 50 includes the recesses and the bore includes the détentes. The length of the détentes 58 is defined by an outside long radius $r_2$ of the mounting member 50 and an inside short radius $r_1$ of the opening 62 for a particular mirror design. The width a and the height b of the détentes 58 are also application specific. In this embodiment, there are three symmetrically disposed détentes 58 for each of the unfolded, forward-folded and rearward-folded positions. However, this is by way of a non-limiting example in that other mirror designs may have less or more détentes 58.

As will be discussed in more detail below, an inner end 68 of the ramped edges 60 of the détentes 58 and the corresponding ramped edges of the recesses 64 has a steeper angle $\beta_1$ than the angle $\beta_2$ of an outer end 70 of the ramped edges 60 of the détentes 58 and the corresponding ramped edges of the recesses 64.

When the mirror assembly 10 is assembled, the tabs 36 of the pivot tube 30 are extended through the notches 46 and 52, and the pivot tube 30 is rotated so that the tabs 36 align with the projections 54 between the notches 52. The pivot spring 32 applies pressure to the projections 48 between the notches 46 and the upper rim 34 of the pivot tube 30 so that the case frame 16 is secured to the base frame 24. The case frame 16 is able to rotate on the pivot tube 30 and the mounting member 50 against the bias of the spring 32 so that the housing 14 can be rotated relative to the arm 20.

When the mirror assembly 10 is in the unfolded position, the détentes 58 are positioned within the recesses 64 and the bias provided by the spring 32 tightly holds the housing 14 in this position. By applying enough forward or backward force to the housing 14, either manually or electrically, the ramped edges 60 of the détentes 58 allow the housing 14 to be rotated against the bias of the spring 32. When the housing 14 is rotated to a forwarded folded position, the détentes 58 are positioned in the recesses 64 one position over from the unfolded position in a clock-wise direction. When the housing 14 is rotated to a rearward folded position, the détentes 58 are positioned in the recesses one position over from the unfolded position in a counter-clockwise direction. Both sides of the détentes 58 are angled for this purpose.

Figure 6:
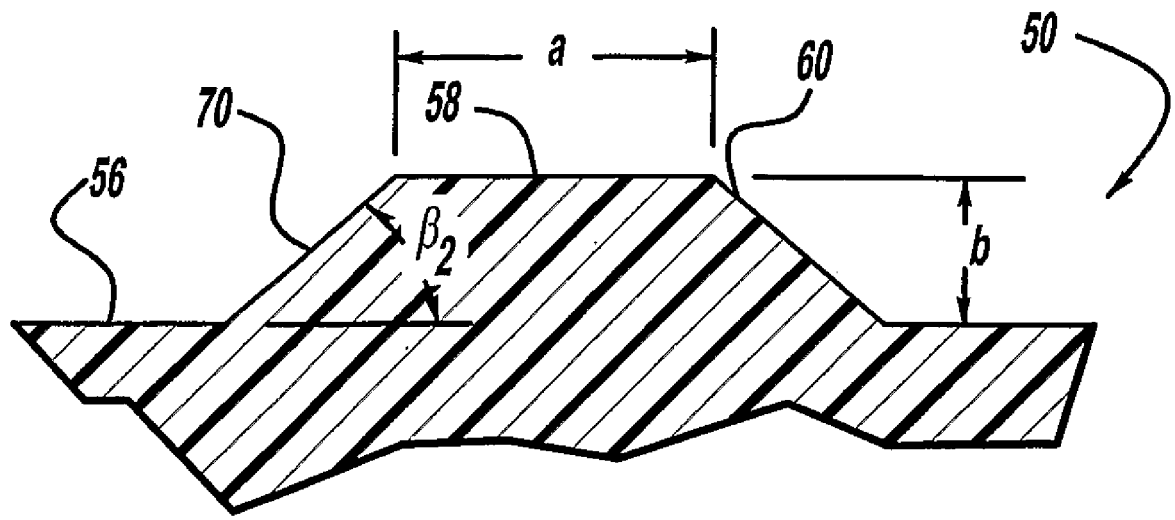
FIG. 6 is a cross-sectional view of a ramped détente of the side mirror through line 6-6 in FIG. 4.
Figure 7:
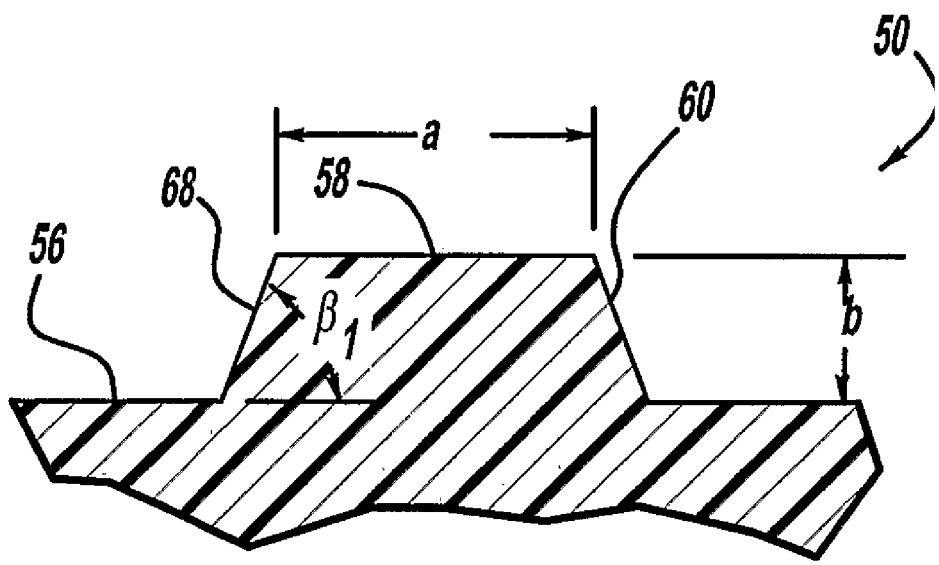
FIG. 7 is a cross-sectional view of a ramped détente of the side mirror through line 7-7 in FIG. 4.

As mentioned above, the ramp angle $\beta_1$ of the inner end 68 of the ramped edges 60 of the détentes 58 is steeper than the ramp angle $\beta_2$ of the outer end 70 of the ramped edges 60 of the détentes 58. FIG. 6 is a cross-sectional view through line 6-6 in FIG. 4 of the outer end 70 of one of the détentes 58, and FIG. 7 is a cross-sectional view through line 7-7 in FIG. 4 of the inner end 68 of one of the détentes 58. The ramp angle of the ramped edges 60 changes gradually and continuously from the ramp angle $\beta_1$ to the ramp angle $\beta_2$ when moving from the inner end 68 to the outer end 70. In a preferred embodiment, the width of top planar surface of the détentes 58 remains constant. However, it will be readily appreciated by those skilled in the art that in other embodiments the width of the planar surface can vary without deviation from the scope of the present invention.

In one embodiment, the relative angle of the ramped edges 60 of the détentes 58 is determined by equation (1) below. This difference between the ramp angle $\beta_1$ and the ramp angle $\beta_2$ allows the entire surface of the ramped edges 60 to make contact with the corresponding edge of the recess 64 when the housing 14 is rotated to decrease the wear of the détentes 58 and increase the fold durability of the mirror assembly 10.

$$\beta_2 = \tan^{-1}(r_1/r_2)\tan(\beta_1) \tag{1}$$

While the subject invention is discussed showing a pivot tube arrangement, it will be readily appreciated by those skilled in the art that the features of the present invention may be incorporated into other mirrors. For instance, other mirror pivot designs incorporate other means of coaxial location, such as a tube extending from the head through a hole in the base, or conical ribs on the base that fit into a conical slot in the mirror head. It will be readily appreciated that the specialized ramp détentes and twisted plane ramp geometry (used for load distribution) set forth herein may be used on pivotal mirror constructions other than the one described herein.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A mirror assembly comprising:
    a mounting structure including a cylindrical mounting member having a top surface, said top surface including a plurality of détentes having ramped side edges; and
    a foldable structure including an internal bore, said internal bore including a mounting portion that accepts the cylindrical mounting member, said mounting portion including a plurality of recesses having angled edges that accept the détentes, said foldable structure being rotatable on the mounting member, wherein an angle $\beta_1$ of the ramped edges of a short radius $r_1$ end of each détente has a steeper angle than an angle $\beta_2$ of the ramped edges of a long radius $r_2$ end of each détente.

2. The mirror assembly according to claim 1 wherein the relationship of the angle of the ramped edges of the détentes is defined by $\beta_2 = \tan^{-1}(r_1/r_2)\tan(\beta_1)$.

3. The mirror assembly according to claim 1 further comprising a pivot tube extending through the bore and being partially positioned within the mounting member and a pivot spring positioned within the bore, said structure pivoting on the pivot tube against the bias of the spring.

4. The mirror assembly according to claim 1 wherein the plurality of détentes is three symmetrically disposed détentes.

5. The mirror assembly according to claim 1 wherein the ramp angle of the ramped edges changes gradually and continuously from the ramp angle $\beta_1$ to the ramp angle $\beta_2$.

6. The mirror assembly according to claim 1 wherein a top planar surface of each détente has a substantially constant width through the entire length of the détente.

7. The mirror assembly according to claim 1 wherein the mounting structure and the foldable structure are plastic molded components.

8. The mirror assembly according to claim 1 wherein the mirror assembly is a vehicle side mirror assembly.

9. A vehicle side mirror assembly comprising:
a mounting bracket including a cylindrical mounting member having a top surface, said top surface including three symmetrically disposed détentes having ramped side edges;
a foldable housing including an internal bore, said internal bore including a mounting portion that accepts the cylindrical mounting member, said mounting portion including three symmetrically disposed recesses having angled edges that accept the détentes, said housing being rotatable on the mounting member; and
a pivot tube extending through the bore and being partially positioned within the mounting member, said housing pivoting on the pivot tube, wherein an angle $\beta_1$ of the ramped edges of a short radius $r_1$ end of each détente has a steeper angle than an angle $\beta_2$ of the ramped edges of a long radius $r_2$ end of each détente, and wherein the relationship of the angle of the ramped edges of the détentes is defined by $\beta_2=\tan^{-1}(r_1/r_2)\tan(\beta_1)$.

10. The mirror assembly according to claim 9 wherein the ramp angle of the ramped edges changes gradually and continuously from the ramp angle $\beta_1$ to the ramp angle $\beta_2$.

11. The mirror assembly according to claim 9 wherein a top planar surface of each détente has a substantially constant width through the entire length of the détente.

12. The mirror assembly according to claim 9 wherein the mounting bracket and the foldable housing are plastic molded components.

13. A method of folding a mirror assembly, said method comprising:
providing a mounting bracket including a cylindrical mounting member having a top surface, said top surface including a plurality of détentes having ramped side edges wherein an angle $\beta_1$ of the ramped edges of a short radius $r_1$ end of each détente has a steeper angle than an angle $\beta_2$ of the ramped edges of a long radius $r_2$ end of each détente;
providing a housing structure including an internal bore, said internal bore including a mounting portion that accepts the cylindrical mounting member, said mounting portion including a plurality of recesses having angled edges that accept the détentes;
providing a pivot tube extended through the bore and being partially positioned within the mounting member; and
rotating the housing structure on the pivot tube and the mounting member so that the edges of the détentes push against corresponding edges of the recesses along the entire length of the edges of the détentes.

14. The method according to claim 13 wherein providing the mounting bracket includes providing a relationship of the angle of the ramped edges the détentes defined by $\beta_2=\tan^{-1}(r_1/r_2)\tan(\beta_1)$.

15. The method according to claim 13 wherein providing the mounting bracket includes providing three symmetrically disposed détentes.

16. The method according to claim 13 wherein providing the mounting bracket includes providing the ramp angle of the ramped edges that changes gradually and continuously from the ramp angle $\beta_1$ to the ramp angle $\beta_2$.

17. The method according to claim 13 wherein the mounting bracket and the housing structure are plastic molded components.

\* \* \* \* \*